United States Patent [19]

Wittkopp et al.

[11] 4,200,012
[45] Apr. 29, 1980

[54] METHOD AND APPARATUS FOR TRUING RAILROAD WHEELS

[75] Inventors: Helmut Wittkopp; Bernhard Kunze, both of Erkelenz, Fed. Rep. of Germany

[73] Assignee: Firma W. Hegenscheidt Gesellschaft mbH, Erkelenz, Fed. Rep. of Germany

[21] Appl. No.: 889,914

[22] Filed: Mar. 24, 1978

[30] Foreign Application Priority Data

Mar. 30, 1977 [DE] Fed. Rep. of Germany ....... 2713997

[51] Int. Cl.² ............................................. B23B 5/28
[52] U.S. Cl. ................................................ 82/1 C; 82/8
[58] Field of Search ................................. 82/1 C, 8, 9

[56] References Cited

U.S. PATENT DOCUMENTS

| | | | |
|---|---|---|---|
| 1,949,512 | 6/1934 | Norton | 82/1 C |
| 2,792,736 | 5/1957 | Oster et al. | 82/8 X |
| 3,207,011 | 9/1965 | Erfert | 82/8 |
| 3,518,914 | 7/1970 | Dombrowski | 82/8 |
| 4,119,001 | 10/1978 | Wittkopp et al. | 82/1 C |

FOREIGN PATENT DOCUMENTS

| | | | |
|---|---|---|---|
| 57378 | 1/1910 | Austria | 82/8 |
| 527156 | 6/1931 | Fed. Rep. of Germany | 82/8 |
| 14335 | 10/1956 | Fed. Rep. of Germany | 82/8 |
| 759913 | 10/1956 | United Kingdom | 82/8 |

*Primary Examiner*—Harrison L. Hinson
*Attorney, Agent, or Firm*—W. G. Fasse; D. F. Gould

[57] ABSTRACT

A tool for use in a lathe for truing railroad wheels comprises a plurality of cutting tools mounted on a common tool carriage. One of the tools is independently movable relative to the other tool or tools so that the rolling surface and wheel flange of a worn wheel may be trued in a single axial cutting stroke of the tool carriage. The arrangement is such that the movable tool is withdrawn after cutting at least a portion of the worn rolling surface, and another tool cuts the remaining defective stock of the rolling surface as well as the wheel flange.

5 Claims, 6 Drawing Figures

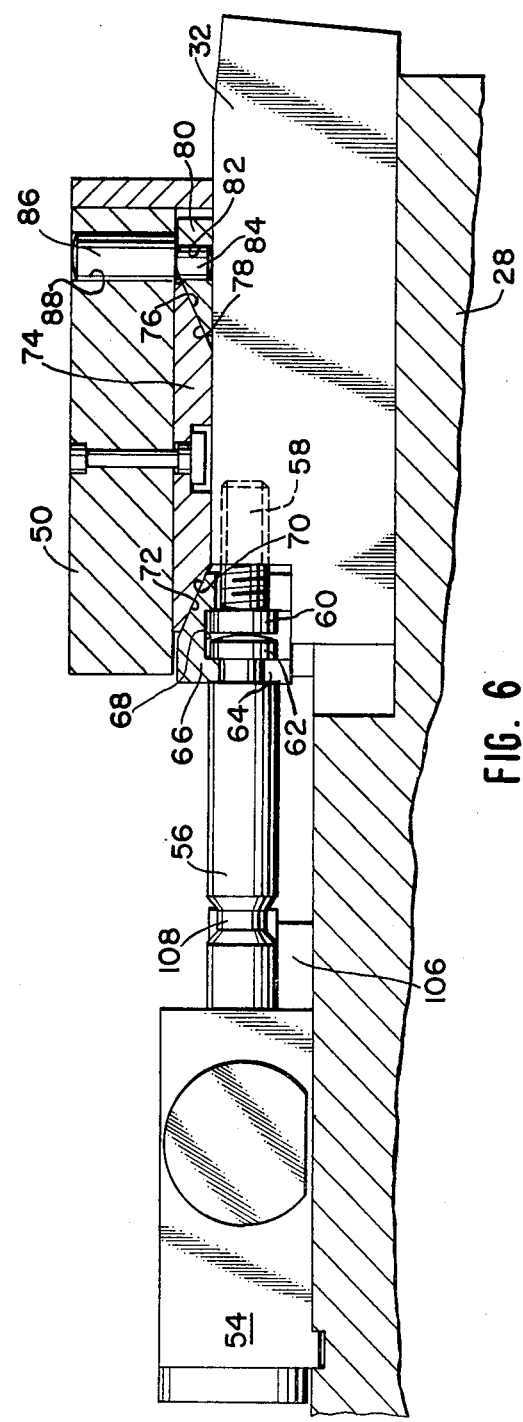

METHOD AND APPARATUS FOR TRUING RAILROAD WHEELS

The present invention relates to a method and apparatus for truing railroad wheels. The truing is accomplished by means of tools supported on a tool carriage, carrying at least two cutting tools of which at least one cutting tool prepares the profiled zones of the wheels for the finish truing.

As is well known in the art, sets of railroad wheels comprising two wheels rigidly mounted on a common axle are subjected to stresses and shearing forces which in time cause an unevenly distributed wear and tear of the wheels to the point where they seriously impair the safe operation of the vehicles which the wheels support. Wearing off of the two wheels of a set is usually uneven from wheel to wheel and also around the outer wheel surface of the one and the same wheel. Means and methods have been devised for the rehabilitation of such worn wheel sets. For instance, they can be machined in automatic lathes which by cutting the worn rolling surfaces and flanges restore the peripheral profiles of the wheels as they were originally. Of course, such cutting results in a reduced diameter of the wheels so that certain limits are placed on the number of times a wheel set can be trued. Such cutting operations aim at removing as little as possible of the material of the worn-out peripheral wheel surfaces. The cutting or truing is carried out by lathes equipped with two tool carriages -one for each wheel of a set. The carriage movements are controlled by a template or the like cooperating with the carriages by means of appropriate feelers. Heretofore, it has been a common practice to precut over the treads and wheel flanges of wheel sets suffering from relatively minor wear by specially formed cutting tools and by thereafter subjecting the treads and wheel flanges to a further cutting by tools operating independently of the tools used for the precutting, thus providing the wheels with trued profiles. Precutting by separate tools has been found necessary since owing to the usually very different distribution of the depths of wear across the width of the peripheral profiles of the wheels, the depths of the cut required in the zones of least wear, for producing the true profiles, as a rule exceeds the cutting depth capability of commercially available cutting inserts.

Thus, using commercially available cutting inserts for reconditioning peripheral wheel profiles by known truing methods has necessitated several time consuming sequential operations employing different tool supports or carriages.

For instance, German Pat. No. 1,258,237, discloses a lathe for reprofiling wheel sets, in which for each wheel two radial displaceable tool slides are mounted on a common transversable displaceable carriage. Each of the radial displaceable slides supports a cutting tool and each of the said slides is provided with its own copying feeler cooperating with a template common to both of the said slides. In this machine each tool turns its own portion of the peripheral wheel profile in such a manner that the two consecutive portions result in the final profile. However, this type of operation still requires several cutting strokes whenever the required cutting depth exceeds the safe cutting range of the tools. Furthermore, the feed advance of the tool operating on the tread of the wheel, can in no event be different from the relatively low axial feed advance of the tool turning the wheel flange. Thus, the tread can be cut only with very low feed advance.

OBJECTS OF THE INVENTION

In view of the foregoing it is the aim of the invention to achieve the following objects, singly or in combination:

to provide a wheel lathe which permits truing of sets of railroad wheels in a single cutting stroke of one tool carriage operating on each wheel, regardless of the depth to which worn material has to be removed from the worn profile;

to provide a cutting tool which may be mounted on conventional wheel set truing lathes with a minimum of adaptations, for completing a turning operating in a single path regardless of the required cutting depth;

to provide for a tool carriage mounting a plurality of cutting tools at least one of which is independently movable with respect to the other tool or tools, and having means for so moving the tool;

to substantially reduce the truing time, while simultaneously using relatively inexpensive tools;

to assure that a substantially uniform load is applied to the power drive means of the lathe throughout the truing operation; and to provide for a method of operating a wheel set cutting lathe in such a manner that truing of each wheel requires no more than one axial cutting stroke of a tool carriage.

SUMMARY OF THE INVENTION

The present invention relates to a method and apparatus for truing the worn profiled peripheral surface of a rotating wheel, particularly of railroad wheels having a peripheral wheel surface comprising a tread and a wheel flange.

The invention comprises a tool carriage mounted on a lathe for movement in directions normal to, and axially of, a wheel rotatingly supported in a lathe. A plurality of cutting tools having cutting means disposed toward the peripheral surface of the wheel are mounted on the tool carriage. At least one of the tools is independently movable relative to the other tool or tools. Means are provided for moving said one tool between a first position in which it may be moved into cutting engagement with at least tread of the peripheral surface of the wheel and a second position in which cutting engagement with the tread of the wheel is prevented, but in this position it should be possible to precut the top of the flange.

In a preferred embodiment of the invention, the tool carriage is provided with three tools aligned in parallel with respect to each other, one tool being mounted for sliding movement between, and independently of, the other two tools. Preferably the two tools are rigidly mounted on the carriage for sliding engagement with the movable tool.

In another embodiment the invention provides a lathe for truing railroad wheel sets comprising means for rotatively driving a set of wheels about the longitudinal axis of its axle, a tool carriage comprising a plurality of cutting tools, at least one of which is independently movable relative to the other tools by means for moving said one tool, and means for moving the tool carriage in directions normal to, and axially of, the peripheral surface of at least one wheel.

The invention also provides a method of truing a railroad wheel by means of a tool carriage provided with at least two cutting tools arranged one alongside the other in the direction of cutting. At least one tool is used for precutting at least one profiled surface zone of the wheel, and the precutting tool is retracted prior to finish cutting the wheel flange by another tool. Preferably, the tread is precut by one tool simultaneously with the precutting of the wheel flange by another tool.

BRIEF FIGURE DESCRIPTION

In order that the invention may be clearly understood, it will now be described, by way of example, with reference to the accompanying drawings, wherein.

Figure 3:
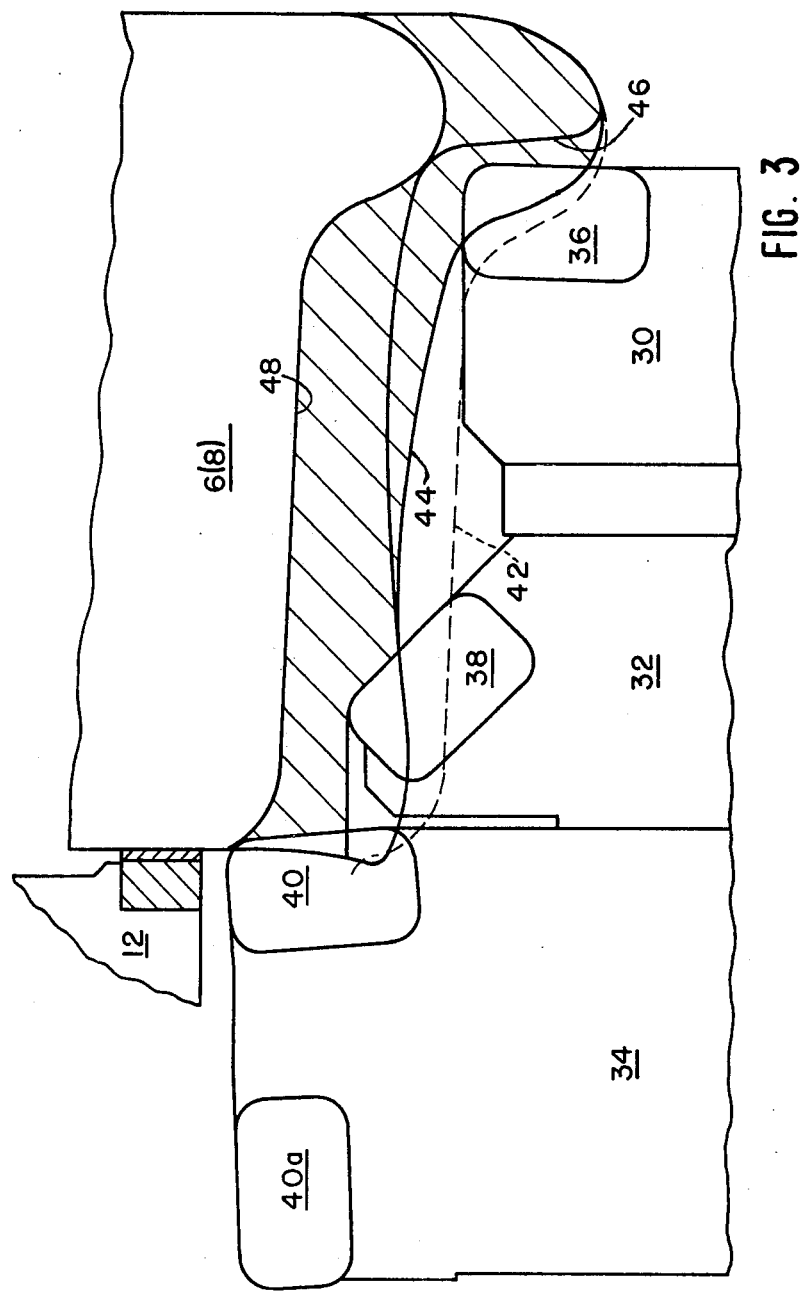
Figure 4:
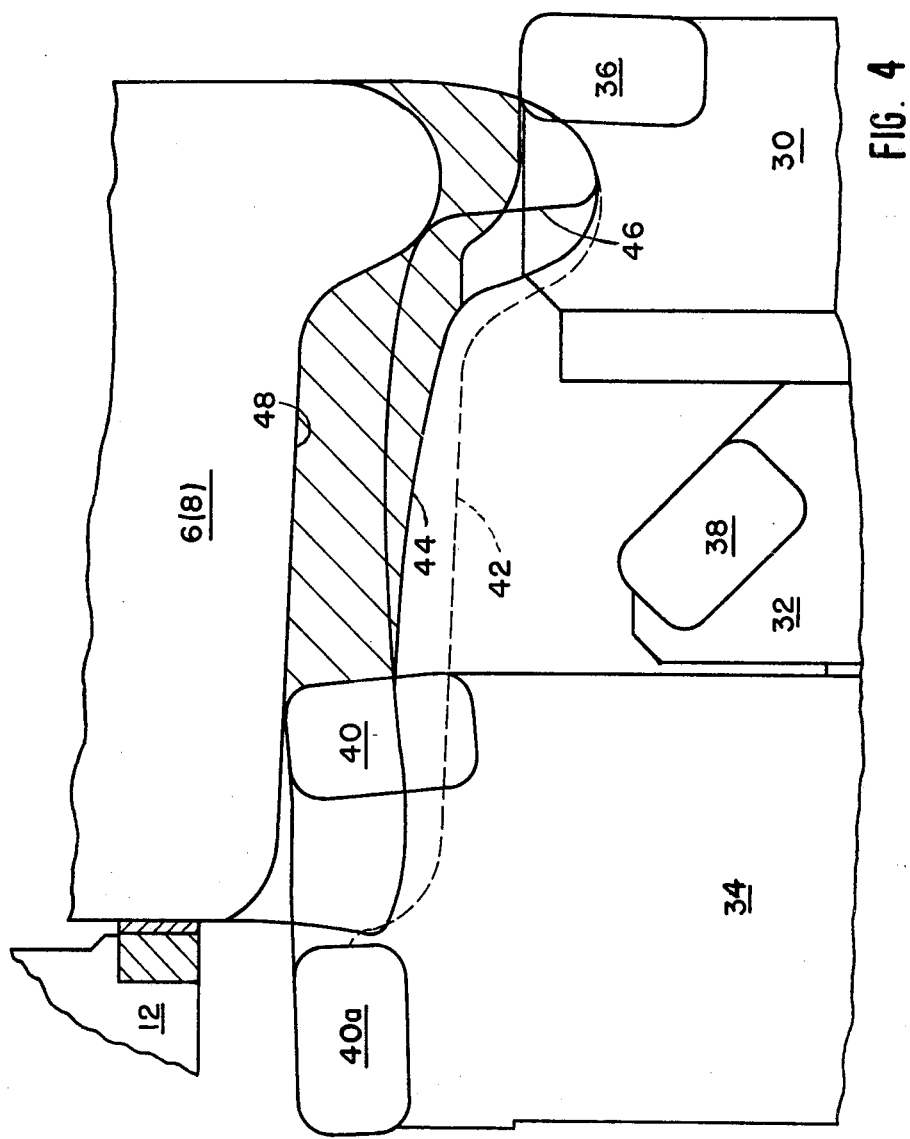
Figure 5:
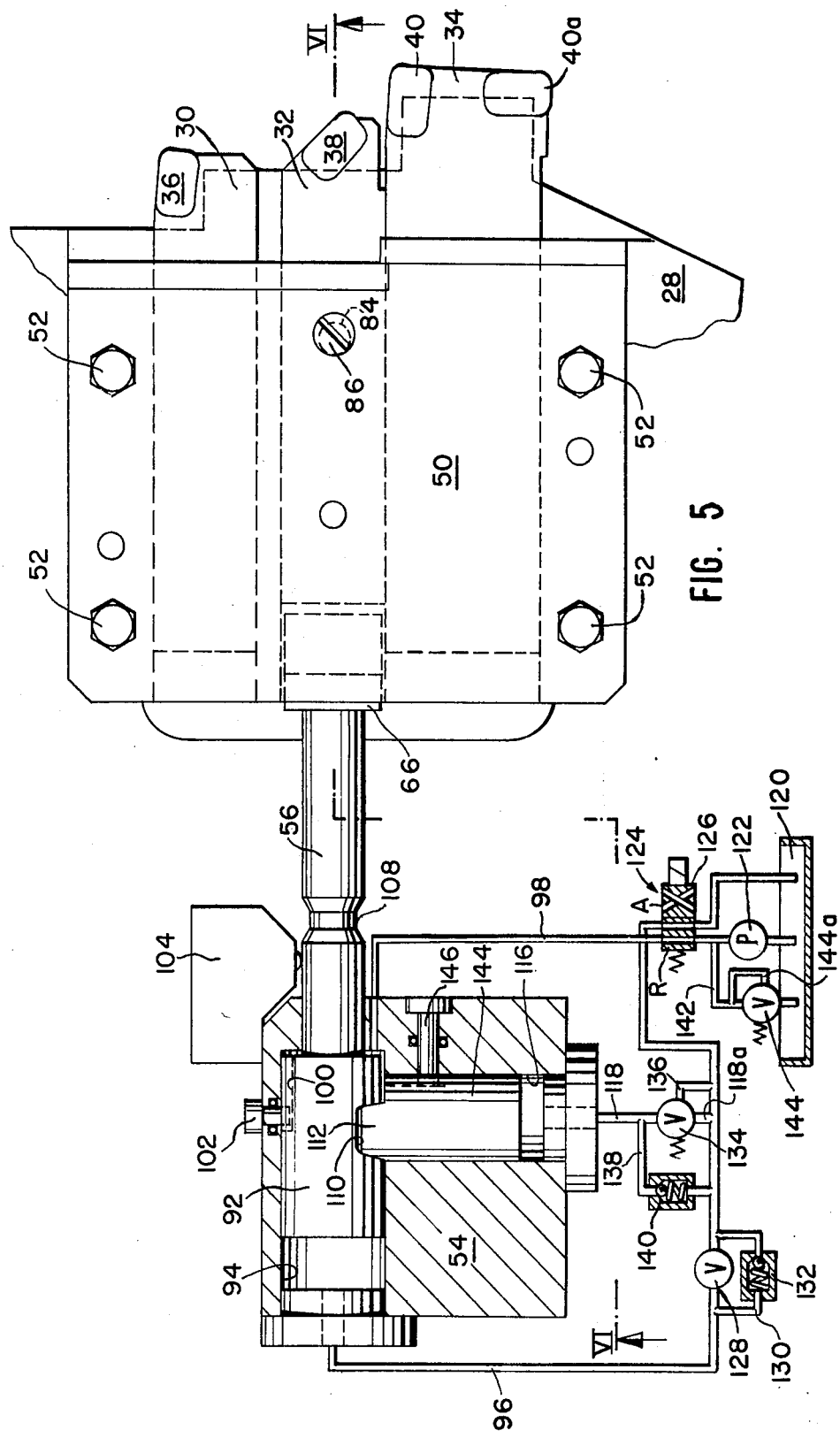

FIG. 3 shows, on an enlarged scale, the profiles of two wheels projected into the same plane and thus in superposition, the original trued profiled surface condition is shown by the dashed line, the different worn conditions are shown by the radially outer full lines, the final condition to be imparted by means of the invention is shown by the radially inner line, said final condition will be achieved after removal of the hatched areas as taught herein;

FIG. 4 is a view similar to that of FIG. 3, but showing the movable tool retracted after comletion of its operating cycle, and the tool for imparting the final profile to the peripheral surface zones of the wheel in an early stage of its operating stroke;

FIG. 5 is a schematic planar view, partly in section and with parts broken away for clarity, of the tool carriage of the invention showing the position of the tools thereon with the movable tool in its advanced position, and the means for moving the tool; and FIG. 6 is a view taken along line VI—VI in FIG. 5.

DETAILED DESCRIPTION OF A PREFERRED EXAMPLE EMBODIMENT

Figure 1:
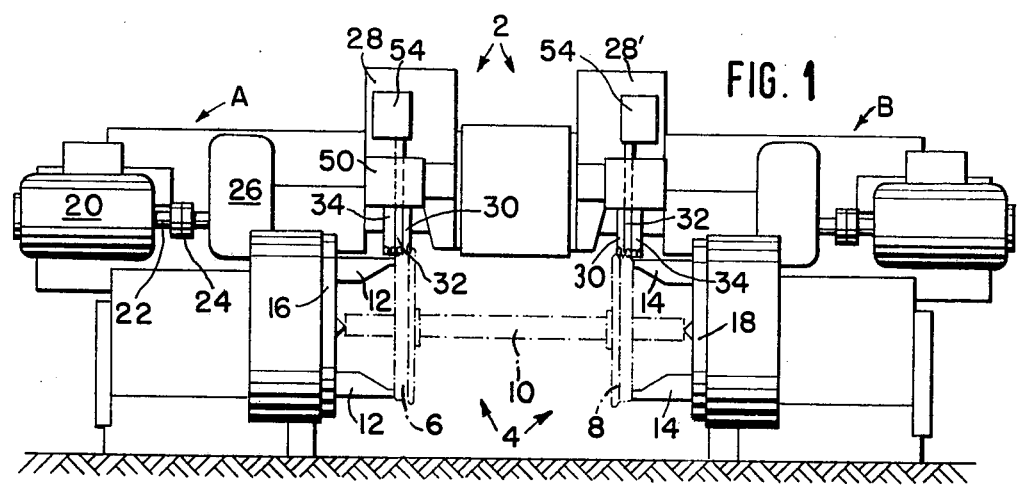
FIG. 1 is a schematic front view of a truing lathe for railroad wheel sets in accordance with the invention, having a tool carriage and tools on the carriage, whereby the tools are shown in cutting engagement with the profiled surface zones of the wheels.
Figure 2:
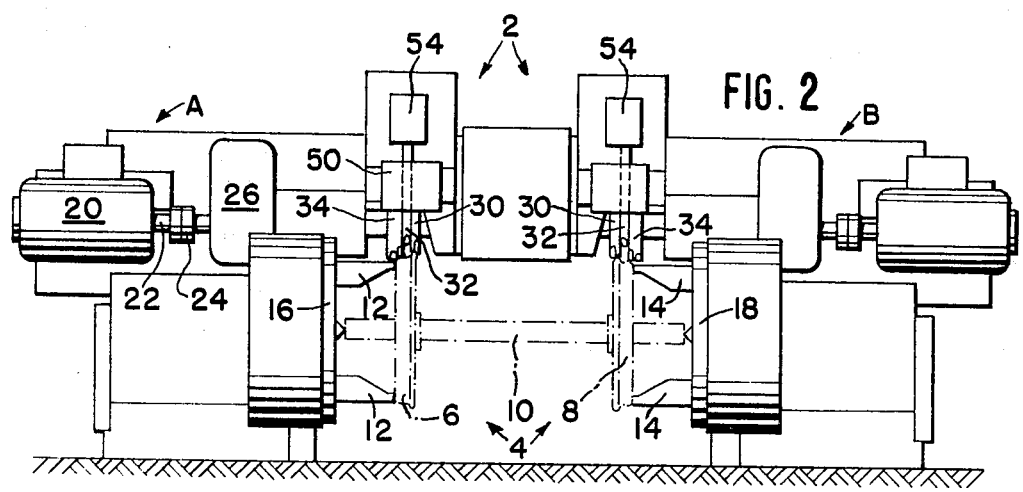
FIG. 2 is a view similar to that of FIG. 1, but showing the movable tool retracted from cutting engagement with the peripheral surface of the wheel.

FIGS. 1 and 2 show a lathe of the kind used for truing sets of railroad wheels. As is conventional, the lathe 2 comprises two symmetrically identical sections A and B. Each section A and B has a wheel set centering face plates 16 and 18. The face plates 16 and 18 face each other and are axially aligned. Wheel clamping means 12, 14 are provided respectively, which are telescopingly mounted in their respective face plates 16 and 18 for supporting a set of railroad wheels 4 comprising symmetrically identical wheels 6 and 8 rigidly mounted in axial alignment on a common axle 10. The wheel set 4, shown in dotted lines, is held by the clamping means 12 and 14 of the face plates 16 and 18 so that its longitudinal axis coincides with the axis of rotation of the face plates.

Since the two sections A and B of the lathe 2 are of identical construction, only one of them will be described to the extent necessary to explain the invention. As may be seen, torque is imparted to the face plate 16 by a motor 20, the output shaft 22 of which is connected to a conventional gear mechanism 26 by way of a torque limiting clutch 24. Accordingly, when the motor 20 is energized and the gears are engaged the face plate 16 will rotate and transfer its motion to the wheel set 4. The clamping means 12, 14 between the face plate 16 and the wheels 6, 8 are of conventional construction, and the means for advancing them out of, and retracting them into, the face plate 16 has therefore not been shown. Rotation of the wheel set 4 serves for cutting the profile of the peripheral surface of the wheels 6, 8 by means of tools next to be described.

Portion A of the lathe 2 is provided with a tool carriage 28 including means for moving the carriage in directions normal to, and axially of, the axis of rotation of the wheel set 4. Similarly, lathe section B is provided with a tool carriage 28' including associated moving means. Both carriages 28, 28' move in mirror-symmetrical uniformity relative to each other. To this end the movements of the carriages are controlled by a template or the like (not shown) to which the carriages are operatively connected by appropriate feelers or sensors as is known in the art.

The carriage 28 supports a plurality, e.g., three, cutting tools 30, 32, and 34. As is more clearly shown in FIGS. 3 and 4 of the drawings, tool 30 is provided with a cutting bit 36, tool 32 is provided with a cutting bit 38, and tool 34 carries two cutting bits 40 and 40a. The tools 30, 32, and 34 serve to recondition the worn profiled surfaces of railroad wheels including the tread and wheel flange of railroad wheels to a profile substantially identical to the original profile, by turning worn surface areas. In accordance with the invention this cutting operation is accomplished in a single cutting stroke of the tool carriage 28 as will be described.

FIGS. 3 and 4 show the profiles of the rolling surfaces and wheel flanges of wheels 6 or 8. The dashed line 42 shows the original, new profile of the wheels 6 or 8. The profile shown by line 44 is the worn out profile of the wheel 6. Line 46 shows that the wheels of the same set of wheels may be differently worn. Finally, line 48 shows the profile to which the surfaces of both wheels are to be cut or trued by the means of the present invention. The somewhat reduced diameter after truing has been found to be acceptable.

FIG. 3 shows the tools 30, 32, and 34 in positions they assume at the beginning of a cutting operation which begins at the edge of the tread and advancing toward the wheel flange. The initial alignment of the tools relative to the peripheral surface of the wheel 6 or 8 is such that bit 36 of tool 30 may or may not be in engagement with the flange of the wheel, depending upon how much metal must be removed of the section intermediate the tread and the wheel flange. Bit 38 of tool 32 commences turning the edge of the tread opposite the wheel flange and is then driven toward the wheel flange. If bit 36 of tool 30 is not already in cutting engagement with the shoulder, or at least an adjacent portion thereof, of the wheel flange, it will come into cutting contact with these wheel surface sections no later than some time after tool 32 has begun its turning operation. Bit 38 is inclined at an angle relative to the direction of its cutting stroke. This angle may, for example, be in the order of about 135° to reduce shearing stresses to which the bit 38 may be subjected.

As shown in FIG. 3, bit 36 of tool 30 has cut into the worn profile section of the wheel flange of wheel 6, and bit 38 of tool 32 has cut into the worn profile section of the tread of wheel 6. Bit 40 of tool 34 is shown in initial contact with the edge of the tread surface of wheel 6. The resulting cutting motion of the tools 30, 32, and 34 after completion of the truing is identical to the shape of the profile 48.

FIG. 4 shows the position of the tools 30, 32, and 34 with respect to the wheel 6 (or 8) at a time when bit 36 of tool 30 has just finished cutting off worn material from the wheel flange of wheel 6 (or 8). Tool 32 is shown (see also FIG. 2) in a position retracted from turning engagement with the tread of the wheel after it has turned a portion of the worn material of the tread (see FIG. 3). Bit 40 of tool 34 is shown to have cut an initial portion of the tread to its final profile and is at this point the only tool in cutting engagement with the wheel surface. It can thus be driven with the full torque of the lathe 2.

It is an advantage of the invention that due to the precutting of portions of the tread and of the wheel flange of the wheel 6 (or 8) by the tools 32 and 30, respectively, tool 34 does not encounter at any point of its cutting stroke surface portions requiring cutting to a depth exceeding the effective cutting range of its bit 40. As the cutting stroke is executed in a direction from left to right as seen in FIG. 4, neither tool 30 which has travelled beyond the wheel flange, nor tool 32 which has been withdrawn from its cutting engagement with the tread of the wheel 6 (or 8) further influences the cutting operation of tool 34 which is now free to execute its cutting stroke under the control of a template which defines the movement of the tool carriage 28. Thus, when bit 40 has moved beyond the wheel flange, the bit 40a of the tool executes a curved cutting motion in a direction toward the axis of rotation of the wheel 6 (or 8) and thus imparts the desired rounded profile configuration to the wheel flange as shown by line 48 in FIGS. 3 and 4.

The position of the tools 30, 32, and 34 with respect to each other and relative to the peripheral surface of the wheel depends upon the depth and location of worn material across the width of the peripheral surface of the wheel as measured by methods and devices well known in the art. These criteria also determine the location along the surface of the wheel at which tool 32 is to be withdrawn from further cutting.

The means for moving the tool 32 independently of tools 30 and 34 are shown in FIGS. 5 and 6 and will now be described.

In addition to the tools 30, 32, and 34 the carriage 28 supports motor means 54 for moving the tool 32 independently of tools 30 and 34 in a direction normal to the rotational axis of the wheel set 4. The motor means 54 comprises a housing fixedly mounted on the carriage 28 in a position behind the tools 30, 32, and 34, i.e., on their side opposite the wheel set 4. The motor means 54 are connected to the tool 32 by a piston rod 56.

As shown in FIG. 5 tools 30 and 34 are fixedly mounted on the carriage 28 by means of a clamping plate 50 under which the tools are located and which is itself fixed to the carriage by bolts 52. The tools 30 and 34 are placed so that longitudinal surfaces face each other and are positioned in parallel relationship leaving a space between them of sufficient width to accommodate the tool 32 for sliding movement therein. The opposing longitudinal surfaces of the tools 30 and 34 serve as guide members for preventing the transverse movement of the tool 32.

As best seen in FIG. 6, a bolt 58 having a head 60 is threadedly received in a threaded bore in tool 32 and is coaxially aligned with the piston rod 56. The piston rod 56 is provided with a head 62 offset from the rod proper by an annular groove 64. The head of the bolt 58 and the head 62 of the piston rod 56 abut each other and are maintained in this relationship by a wedge member 66. The wedge member is provided with a recess 68 embracing shoulder portions of heads 60 and 62, thus constituting a mechanical link between the tool 32 and the piston rod 56.

An inclined surface 70 of the wedge member 66 is positioned in sliding engagement with a matchingly inclined surface 72 of a plate 74 mounted for limited movement under clamping plate 50 and on the upper surface 90 of tool 32. An opposite end of plate 74 is provided with a further inclined surface 76 which is in sliding engagement with a correspondingly inclined surface 78 of a further wedge member 80. The wedge member 80 has a cylindrical bore 82 extending normal to the upper surface 90 of the tool 32. An eccentric extension 84 of a shaft 86 is journalled in the bore 82, to make possible an adjustment of the position of the wedge member 80 in order to insure desired clamping action of the wedge member 80 and the wedge member 66 when the tool 32 is in working position as shown in FIG. 6 the shaft 86 being itself journalled in a bore 88 provided in the clamping plate 50. Therefore, if the tool 32 is caused to move to the right as seen in FIG. 6, the wedge member 66 causes the plate to move to the right against the wedge member 80 also as well as upwardly against the lower surface of the clamping plate 50. Since the inclined surface 76 of the plate slides upwardly along the inclined surface 78 of the wedge member 80, the latter is caused to clamp against the upper surface 90 of the tool 32. The tool 32 is in turn moved downwardly and thus securely clamped against the tool carriage 28. In this manner the moveable tool 32 is prevented from vibrating or otherwise moving during its cutting operation.

The end of the piston rod 56 opposite the tool 32 is attached to a double acting piston 92. The piston 92 is mounted for sliding movement in a cylinder 94 connected to two hydraulic lines 96 and 98. To secure the piston 92 against rotational movement there is provided an axial guide comprising an axial groove 100 in the wall of the piston 92 and a bolt 102 mounted in the housing of the motor 54 and protruding into the groove 100. Whether the piston 92 and, hence, the tool 32 are in their forward position shown in FIG. 5, or whether they are in a retracted position is sensed by a switch 104 mounted on the carriage 28 by means of a support 106 and engageable by an annular groove 108 provided in the piston rod 56.

The piston 92 is shown to have a recess 110 cut into its wall and cooperating with an extension 112 protruding from the front surface of a piston 114 the longitudinal axis of which extends normal to the longitudinal axis of the piston 92. The piston 114 is a double acting one and is slidably mounted in a cylinder 116, the forward end of which opens into the cylinder 94. The cylinder 116 is connected to a source of hydraulic fluid by way of hydraulic lines 98 and 118. As will be described below, when the piston 92 is in its forward position the piston 114 is driven against it with the extension 112 protruding into the recess 110, to lock the piston 92 and the tool 32 in their forward positions.

Hydraulic fluid is supplied to the cylinders 94 and 116 from a sump 120 by means of a pump 122. A switch valve 124 having a slide, determines whether hydraulic fluid is pumped into the cylinders 94 and 116 to advance their respective pistons 92 and 114 or to retract them. For purposes of advancing the pistons 92 and 114 the slide 126 is provided with separate crossed conduits shown at A, and for retracting the pistons the slide 126 has parallel conduits in a section marked R. In the position shown in FIG. 5 the slide is set for retracting the pistons 92 and 114. Hydraulic line 96 is provided with a flow control valve 128 which is adjustable. The valve 128 has a by-pass 130 including a one-way valve 132. Hydraulic line 118 branches off line 96 by way of a pressure sequence valve 134. Valve 134 is a valve having a pilot conduit 136 separate from its input conduit 118a. Furthermore, its output leading into line 118 is provided with a branch conduit 138 including a one-way valve 140 leading to hydraulic line 96. The pump 122, at its output, is provided with a branch conduit leading to the sump 120 by way of a pressure linking valve 144.

The operation of the present method and apparatus will now be described. Prior to mounting a wheel set 4 to be trued on the face plates 16 and 18, the tool carriages 28 are moved to positions in which their respective tools do not engage the peripheral surfaces of the wheels 6 and 8. The extent to which the tool carriages 28 of lathe portions A and B are allowed to move transversally of the rotational axis of the wheels 6 and 8 is then programmed by appropriately positioning a template for controlling the movement of the carriages 28, or by other methods well known in the art. Thereafter the wheel set 4 is mounted on the face plates 16 and 18 and the motors 20 are energized. Prior to moving the tool carriages 28 into positions in which at least one tool engages the edge of the tread of the wheels 6 and 8, the tool 32 is moved forwardly into the position shown in FIG. 3, by energizing the hydraulic motor means 54 shown in FIG. 5. Before starting the pump 122 the switch valve 124, which may be solenoid actuated, is caused to move its slide 126 into the operating position A. With the pump 122 running hydraulic fluid is supplied from the sump 120 to hydraulic line 96 and into the cylinder 94 by way of by-pass 130 and one-way valve 132. The piston 92 is thus advanced to its forward position driving the tool 32 forwardly and causing wedge member 80 and 66 to clamp it securely against the upper surface of the tool carriage 28.

As soon as the cylinder is filled with hydraulic fluid a rise in pressure is sensed by pressure sequence valve 134 to shift admitting hydraulic fluid to cylinder 116. In this manner piston 114 is moved to cause its extension 112 to seat itself in the recess 110 of piston 92, thereby locking the latter in its forward position. A guide 146 prevents the piston 114 from rotating, while the piston 114 advances. A certain amount of hydraulic fluid is urged into branch conduit 138 and through one-way valve 140 into hydraulic line 96 leading to cylinder 94 to prevent piston 92 from retracting. When the piston 114 has reached its forward position there is again a rise in hydraulic pressure which causes valve 144 by way of pilot conduit 144a to shift to a position in which any hydraulic fluid not required for maintaining piston 114 in its forward position is returned to the sump 120.

In the meantime, trip dog or switch 104 will have signaled to means not shown that the tool 32 is in its forward cutting position, all three tools 30, 32, and 34 being now in position to commence cutting of the peripheral surfaces of wheels 6 or 8 and the tool carriages 28 are advanced into positions in which the wheel flange cutting tool 30 is aligned with the wheel flange and the cutting tool 32 is engaging the edge of the tread opposite the wheel flange. At this time cutting tool 34 is not in engagement with any portion of the peripheral surface of the wheel. Cutting with tool 32 in the tread of the wheel then commences along a path substantially parallel to the rotational axis of the wheel set. Thus, a portion of the worn tread of the wheel is turned as shown in FIG. 3. At the time tool 32 commences cutting, or a little thereafter, tool 30 commences turning of worn portions of the wheel flange or, if any is present, material ahead of the wheel flange. As soon as tool 34 comes into engagement with the edge of the wheel surface precut by tool 32, at which time tool 30 will have already finished its turning operation of the wheel flange portion, or at some time thereafter to be determined by the operator of the lathe 2, tool 32 is withdrawn. Thus, tool 34 can perform its final or finish cut of the entire wheel surface, along the profile line 48 controlled by the template regulating the movement of the tool carriage 28. With tool 32 withdrawn and tool 30 having travelled beyond the wheel flange, tool 34 can cut the remaining worn material off the peripheral wheel surface utilizing the entire torque of the lathe 2. As mentioned, the material to be removed by tool 34 at no point exceeds in depth the effective cutting range of the tool because any excess has been previously removed by tools 32 and 30, respectively.

Withdrawal of cutting tool 32 from its first position is accomplished by drawing the piston 92 back into its cylinder 94. To this end slide 126 of valve 124 is moved into the position shown in FIG. 5. Thus, supply of hydraulic fluid to hydraulic lines 118 and 96 is stopped. Hydraulic fluid is now pumped through line 98 into the forward section of cylinder 94 communicating with the forward section of cylinder 116. Piston 114 is pushed back immediately and hydraulic fluid may escape from the rear section of the cylinder 116 without impediment, through hydraulic line 118, branch conduit 138 and one-way valve 140 into hydraulic line 96 and from there into sump 120. Once the extension 112 of piston 114 has been moved out of the recess 110 in the piston 92 the latter is free to retract under the pressure of the hydraulic fluid entering the forward section of cylinder 94. The speed with which piston 92 is retracted depends on the volume flow of the hydraulic fluid in the rear section of the cylinder 94. This volume flow is regulated by the setting of flow control valve 128. By means of the valve 128 the speed with which the piston 92 and, hence, the tool may be retracted is variable. If the valve is fully open the retraction is fast, if the valve is substantially closed the retraction is slow, for example, at the feed advance speed. Retraction of the tool 32 causes the inclined surface 70 of the wedge member 66 to slide away from the inclined surface 72 of the plate 74. Therefore the plate 74 can move backwardly and downwardly and no longer cause clamping force between wedge member 80 and tool 32. As soon as the piston 92 is retracted the switch 104 senses that it has moved out of the annular groove 108 in the piston rod 56 and generates a signal showing that the tool 32 has been withdrawn. Additional means may be provided for causing the switch 104 at this time to disable the hydraulic motor means 54 by shutting off the pump 122.

Once the tool 34 has finished its cutting operation resulting in a fully trued wheel, the carriages 28 may be moved to inoperative positions and the lathe 2 may be shut off for removal of the wheel set 4.

Although the invention has been described with reference to specific example embodiments, it is to be understood that it is intended to cover all modifications and equivalents within the scope of the appended claims.

What is claimed is:

1. A method for truing the profiled surface zones of the wheels of a set of railroad wheels, said profiled surface zones including a tread and a wheel flange, said wheel set being mounted for rotation about an axis of rotation, comprising the steps of: mounting at least two cutting tools on a common carriage means so that at least one of said two cutting tools is movable on said common carriage means relative to the other of said two cutting tools, and moving said common carriage means relative to said profiled surface zones in a direction normal to and in a direction parallel to said axis of rotation into positions to effect cutting of said profiled surface zones, precutting only a portion of the profiled surface zones with one of said tools on said common carriage, moving said one tool on said common carriage out of cutting engagement with the respective precut surface zone portion, and finishing the truing by finish cutting with the other tool across the entire surface of said profiled surface zones, whereby the copying motion of said common carriage carrying both tools remains uninterrupted during the precutting and the finish cutting so that both cutting operations are performed in a single work cycle.

2. The method of claim 1, comprising mounting at least three cutting tools in a row on said common carriage to effect cutting of the profiled zones, precutting the wheel flange surface with a first tool, precutting the tread with a second tool, moving said second tool out of cutting engagement with the tread prior to reaching the wheel flange, and finishing the cutting across the entire profiled surface zones with a third tool, whereby all tools are operated in said single work cycle.

3. The method of claim 2, wherein said first tool and said second tool are employed for precutting substantially simultaneously, and wherein said second tool precuts the tread along a width substantially equal to the width of precutting of the wheel flange by the first tool.

4. The method of claim 1, wherein the tool precutting the portion of the tread is moved out of cutting engagement at the beginning of the finishing cut by the other tool.

5. The method of claim 1, wherein said precutting involves precutting of a portion of the tread, and wherein the wheel flange precutting tool is withdrawn from cutting engagement prior to finish cutting the entire surface of said profiled surface zones.

* * * * *